US006622082B1

(12) United States Patent
Schmidt et al.

(10) Patent No.: US 6,622,082 B1
(45) Date of Patent: Sep. 16, 2003

(54) LOCATION-RELATED WAP TRAFFIC JAM MAP BY ASSOCIATING MAP EXCERPTS IN A TRAFFIC INFORMATION CENTER

(75) Inventors: Maik Schmidt, Meerbusch (DE); Rüdiger Barth, Düsseldorf (DE); Hans Günter Schneider, Mönchengladbach (DE); Reinhard Thomann, Essen (DE)

(73) Assignee: Vodafone Holding GmbH, Dusseldorf (DE)

( * ) Notice: Subject to any disclaimer, the term of this patent is extended or adjusted under 35 U.S.C. 154(b) by 0 days.

(21) Appl. No.: 10/069,554

(22) PCT Filed: Aug. 9, 2000

(86) PCT No.: PCT/DE00/02721

§ 371 (c)(1),
(2), (4) Date: Mar. 26, 2002

(87) PCT Pub. No.: WO01/15117

PCT Pub. Date: Mar. 1, 2001

(30) Foreign Application Priority Data

Aug. 25, 1999 (DE) ........................................ 199 41 130

(51) Int. Cl.[7] ................................................ G06F 19/00

(52) U.S. Cl. ....................... 701/117; 701/118; 701/119; 701/208; 340/990; 340/993; 340/905

(58) Field of Search ................................ 701/117, 118, 701/119, 213, 200, 201, 210, 211, 209, 208, 207; 340/988, 990, 995, 991, 993, 994, 905

(56) References Cited

U.S. PATENT DOCUMENTS

| | | | | |
|---|---|---|---|---|
| 6,255,963 B1 | * | 7/2001 | Heimann | 340/905 |
| 6,266,607 B1 | * | 7/2001 | Meis et al. | 701/117 |
| 6,313,761 B1 | * | 11/2001 | Shinada | 340/995 |
| 6,480,783 B1 | * | 11/2002 | Myr | 701/117 |

FOREIGN PATENT DOCUMENTS

| | | |
|---|---|---|
| DE | 39 18 668 | 12/1990 |
| EP | 0 810 571 | 12/1997 |
| EP | 0 875 878 | 11/1998 |
| EP | 0 880 121 | 11/1998 |

OTHER PUBLICATIONS

Patent Abstracts of Japan, vol. 1997, No. 10, Oct. 31, 1997, JP 09 166450 A (Sumitomo Electric Ind Ltd.) Jun. 24, 1997.

Patent Abstracts of Japan, vol. 1999, No. 03, Mar. 31, 1999, JP 10 326075 A (N T T TELECA:KK), Dec. 8, 1998.

* cited by examiner

*Primary Examiner*—Gertrude Arthur
(74) *Attorney, Agent, or Firm*—Cohen, Pontani, Lieberman & Pavane

(57) ABSTRACT

Simple and multipurpose traffic information is made possible by a method for selecting traffic information which is to be sent to a mobile wireless terminal from a traffic information center and which pertains to a geographic area of a road traffic network selected on the mobile wireless terminal side and/or selected based on the position of the mobile wireless terminal. On the basis of selection information representing the selection of a geographic area, map information pertaining to the selected area is selected in the traffic information center from a digital map of a traffic network, which digital map is available in the traffic information center. On the basis of the selection information, traffic status information pertaining to the geographic area of the road traffic network and representing the traffic status on road sections of the road traffic network are selected from the traffic status information available in the traffic information center. Graphic traffic information based on the selected map information and on the selected traffic status information is transmitted by mobile radio to the mobile wireless terminal for joint graphic display.

13 Claims, 1 Drawing Sheet

LOCATION-RELATED WAP TRAFFIC JAM MAP BY ASSOCIATING MAP EXCERPTS IN A TRAFFIC INFORMATION CENTER

This is a U.S. national stage of application of PCT/DE00/02721, filed on Aug. 9, 2000. Priority is claimed on that application and on the following application: Country: Germany, Application No: 199 41 130.1, filed Aug. 25, 1999.

BACKGROUND OF THE INVENTION

The invention is directed to a method for selecting traffic information to be sent to a terminal by a traffic information center and apparatus for implementing the method.

SUMMARY OF THE INVENTION

The object of the present invention is an efficient selection and transmission of traffic information to a terminal for ergonomic presentation, which terminal is as universal or multipurpose as possible.

According to the invention, traffic information which pertains to a geographic area of a road network is selected on the mobile wireless terminal side and/or selected based on the position of the mobile wireless terminal. On the basis of selection information representing the selection of a geographic area, map information pertaining to the selected area is selected in the traffic information center from a digital map of a road traffic network, which digital map is available in the traffic information center. On the basis of the selection information, traffic status information pertaining to the geographic area of the road traffic network and representing the traffic status on road sections of the road traffic network are selected from the traffic status information available in the traffic information center. Graphic traffic information based on the selected map information and on the selected traffic status information is transmitted by mobile radio to the mobile wireless terminal for joint graphic display.

The transmission of traffic information to a graphics-enabled mobile wireless terminal, particularly a WAP-enabled mobile wireless terminal, allows traffic information specifically relating to the location of the terminal without dependence on special traffic telematic terminals.

Further features and advantages of the invention are indicated in the following description of an embodiment example.

A user of a WAP-enabled terminal selects from a menu item the desired city or, alternatively, a highway and/or highway interchange for which the user would like to have a traffic jam map displayed.

The user will receive, in response, the highway network around the selected city on the WAP phone display of the user terminal. In addition, all current traffic disturbances will be displayed graphically in this map excerpt. In so doing, traffic jams (e.g., solid bold marking) are distinguished from sluggish or slow-moving traffic (e.g., shaded marking). The driving direction in which the disturbance occurs can be determined from the display of the disturbance on the corresponding side of the highway.

Alternatively, for example, the displayed traffic disturbances can be further highlighted by blinking on the display.

In addition, the user is given textual detailed information (highway name, start and end of highway, interchanges between which the delay or disturbance occurs, length of delay in kilometers or mileage, cause and, if required, suggestions for alternate routes or additional instructions, e.g., "do not throw burning objects from window") about the displayed traffic delays. The user can simply scroll through the user terminal from the traffic jam map to this detailed information.

DETAILED DESCRIPTION OF THE DRAWING

Figure 1:
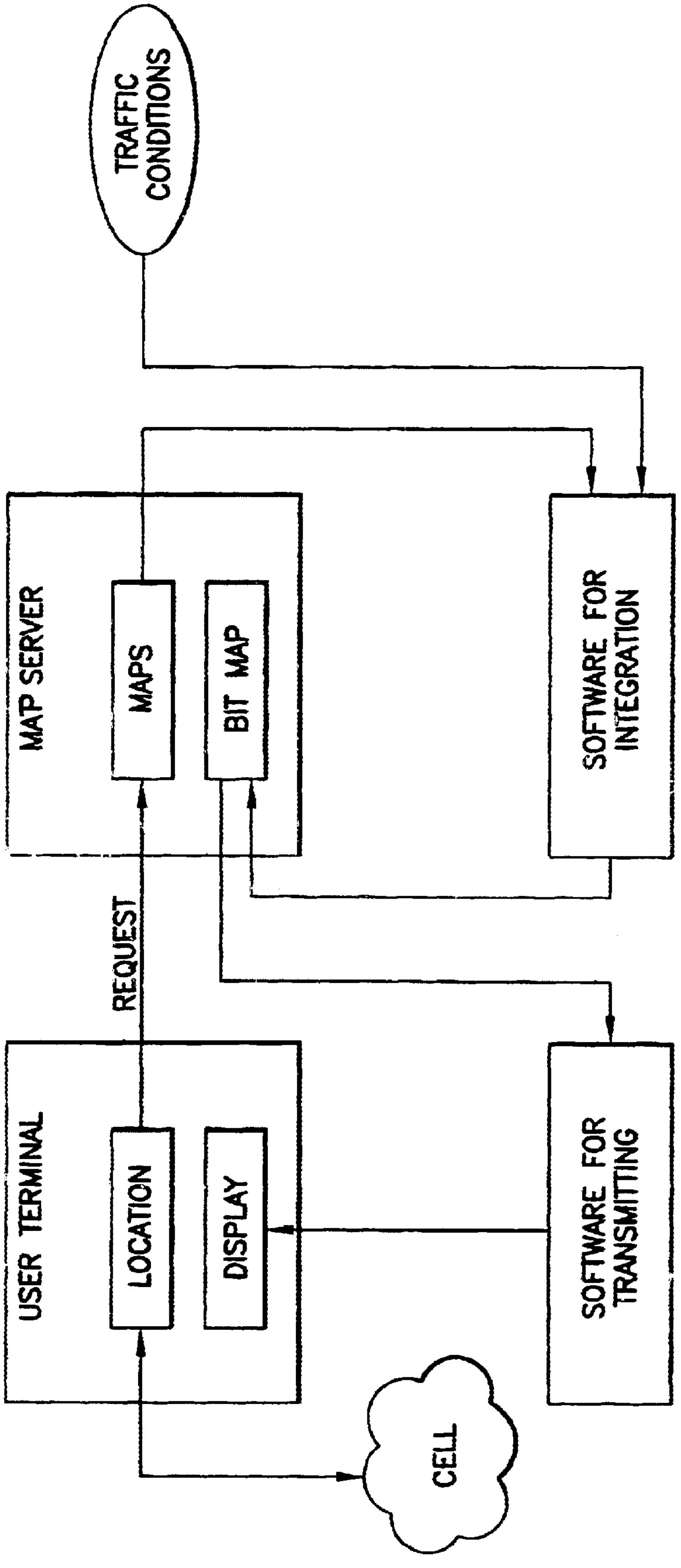
FIG. 1 depicts system for a method for selecting traffic information which is to be transmitted to a mobile wireless terminal in accordance with one embodiment of the invention.

Generation of Traffic Jam Maps:

Maps (in digital form) of the traffic network (e.g., a rod map of Germany and city maps) are available on a map server (in a central traffic bureau). FIG. 1 depicts a method for selecting traffic information which is to be transmitted to a mobile wireless terminal in accordance with one embodiment of the invention. After graphic integration of the information about traffic conditions (e.g., traffic jam, slow-moving traffic, free-flowing traffic, construction areas, cars driving on the wrong side of the road, accidents) which is carried out periodically (e.g., every x minutes), bitmaps are generated through software from previously defined (geographically delimited) map excerpts, these bitmaps being filed on the server in various formats (JPEG, BMP, etc.). These bitmaps are then prepared for transmission (by WAP) and for display on a WAP mobile wireless terminal (mobile phone). (If permitted by processing speeds, it is also possible to initiate application of the method by individual or specific request. In a preferred application, the graphic information is generated periodically and stored for multiple use). Accordingly, information representing an image showing combined traffic information and map information is sent, upon request, from the traffic information center to the WAP mobile wireless terminal.

The digital map in the server can be linked with current traffic information in the following manner: Geocodes which mark the starting point and end point of a traffic disturbance in the map by (exact) indication of coordinates as geographical longitude and latitude are incorporated in the above-mentioned vector cards. Information on federal highway designation, number and type of interchange, and driving direction are assigned to this geocode. The length of a traffic disturbance is determined by means of these reference points. At the same time, it is integrated, as a delay for this road section or road sections, in the vector map (in the routing network of the vector map) as an attribute to be transmitted to the mobile wireless terminal.

In addition to the application for transmitting traffic information and map information, the method is also suitable in principle for transmitting, communicating and displaying other information. For example, weather information (as a weather map) or other information can be transmitted instead of traffic information together with map information.

Transmission via a mobile wireless network can be carried out by means of the WAP standard or other mobile wireless standards suitable for transmitting graphics. In this case, a desired city or a desired location about which traffic information is to be sent is selected on the mobile wireless equipment to which the traffic (or other) information is to be transmitted along with the map information. In this connection, location determination or positioning can be carried out in the mobile wireless equipment, for example, by satellite positioning systems (GPS), mobile wireless cell identification in the mobile wireless terminal or by a central bureau or by user input in a mobile wireless terminal. In the case of positioning based on mobile wireless cell identification in a central bureau for traffic (or other) information, a mobile wireless cell identification of mobile wireless cells in which the mobile wireless equipment is located can be transmitted to this central bureau from the mobile wireless terminal or from a mobile wireless provider. A selection of a location or area for which a digital map with traffic information or other information is to be displayed can be carried out from the terminal to a traffic information center by mobile radio, for example, by mobile wireless messaging (SMS PTP). A map excerpt is then transmitted (in the form of map information) from a central office to the terminal via an elective mobile wireless channel. The map information can be transmitted in pixels or by segments (corresponding to dashes, etc. for roads or road sections). Traffic information pertaining to the status of segments (roads, road sections, driving routes or sections of driving routes) of a road traffic network can be transmitted in a wide variety of ways from the central bureau to the terminal; codes, for example, are preferably stored in tables in the central bureau and in the terminal, which permits compressed transmission. On the terminal side, the map excerpt is displayed graphically on a display of the mobile wireless terminal (or, alternatively, on an auxiliary device which is connected or can be connected to the latter). The traffic information is displayed in the map excerpt on the terminal side. For example, a road in which a traffic jam is taking place can accordingly be shown in a map displayed on the terminal display as a thickened line or by lines parallel to a line (which shows a road or a road section).

The selection of traffic information and/or map information in the traffic information center is advisably carried out based on selection information which pertains to the location of the terminal and which is entered in the terminal or has been detected by satellite positioning (GPS) or determined by mobile wireless identification, etc.

The following acronyms have been used herein

WAP Wireless Application Protocol

GPS Global Positioning System

JPEG Joint Photographic Experts Group

BMP Bitmap

SMS Short Message Service

PTP Point to Point

What is claimed is:

1. A method for selecting traffic information which is to be transmitted to a mobile wireless terminal from a traffic information center, communication between the traffic information center and the mobile wireless terminal taking place over a mobile wireless cell, the method comprising selecting a geographic area of a road traffic network based on at least one of a selection on the mobile wireless terminal side and the local position of the mobile wireless terminal, determining selection information representing the selected geographic area on the basis of mobile, wireless cell identity of the mobile wireless cell defined by the mobile wireless network operator, selecting, on the basis of the selection information, map information from a digital map of a road traffic network, the digital map being available in the traffic information center, selecting, on the basis of the selection information, traffic status information pertaining to the geographic area of the road network and representing the traffic status on road sections of the road traffic network from traffic status information available in the traffic information center, and transmitting graphic traffic information based on the selected map information and the selected traffic status information by mobile radio to the mobile wireless terminal for joint graphic display.

2. A method as in claim 1 wherein the transmitting of graphic traffic information to said mobile wireless terminal is carried out by WAP.

3. A method as in claim 1 wherein the selection information is selected on the mobile wireless terminal from a selection menu comprising at least one of a plurality of cities and a plurality of highways and a plurality of highway interchanges and driving directions.

4. A method as in claim 1 wherein the selection information is selected on the mobile wireless terminal by indicating at least one of a highway and a highway interchange.

5. A method as in claim 1 further comprising transmitting the selection information from a mobile wireless network op tor to the traffic information center.

6. A method as in claim 5 further comprising transmitting the information representing the geographic area from the mobile wireless terminal by WAP to the mobile wireless network operator before transmitting to the traffic information center.

7. A method as in claim 1 wherein the selection information is selected based on the local position of the mobile wireless terminal, the local position being determined by a GPS module on the mobile wireless position side, the map information being selected based on the local position.

8. A method as in claim 1 wherein the map information and the traffic status information pertain to one of a predetermined area in a city and a vicinity of the local position which is one of determined on the terminal side and determined on the mobile wireless network operator side and entered on the terminal side.

9. A traffic information center for selecting traffic information which is to be transmitted to a mobile wireless terminal based on selection information representing a geographic area of a road traffic network, communication between the traffic information center and the mobile wireless terminal taking place over a mobile wireless cell, said selection information being based on at least one of a selection on the mobile wireless terminal side and the local position of the mobile wireless terminal, said information center comprising means for determining selection information representing the selected geographic area on the basis of mobile wire cell identification of the mobile wireless cell defined by the mobile wireless network operator, means for selecting, on the basis of the selection information, map information from a digital map of a road traffic network, the digital map being available in the traffic information center, means for selecting, on the basis of the selection information, traffic status information pertaining to the geographic area of the road network and representing the traffic status on road sections of the road traffic network from traffic status information available in the traffic information center, and means for transmitting graphic traffic information based on the selected map information and the selected traffic status information by mobile radio to the mobile wireless terminal for joint graphic display.

10. A terminal as in claim 9 wherein said graphics display device displays maps of important cities including roads, and displays traffic status information by optically altering relevant sections of the roads by at least one of a colored display and a dashed display and a blinking display.

11. A terminal for displaying traffic information, said terminal comprising a selection device for selecting information representing a geographic area of a road traffic network, a mobile wireless reception device for receiving map information and traffic information for said geographic area that is transmitted to it by radio using WAP, and a graphics display device for joint graphic display of said map information and said traffic status information.

12. A terminal as in claim 11 wherein said selection device comprises a GPS module which permits the local position of the terminal to be determined at a traffic information center, whereby map information and traffic status information for the local position can be received at the terminal from the traffic information center.

13. A terminal as in claim 11 wherein said selection device comprises a menu input device including a keypad.

* * * * *